United States Patent
Bowman et al.

(10) Patent No.: US 9,342,094 B2
(45) Date of Patent: May 17, 2016

(54) MULTI-PROCESSOR SYSTEM AND METHOD FOR INTERNAL TIME SYNCHRONIZATION AND EVENT SCHEDULING OF MULTIPLE PROCESSORS

(71) Applicant: Raytheon Company, Waltham, MA (US)

(72) Inventors: Kassie M. Bowman, Fort Wayne, IN (US); Andrew C. Marcum, Fort Wayne, IN (US); Philip P. Herb, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 540 days.

(21) Appl. No.: 13/777,821

(22) Filed: Feb. 26, 2013

(65) Prior Publication Data

US 2014/0245058 A1    Aug. 28, 2014

(51) Int. Cl.
*G06F 1/12* (2006.01)
*G06F 1/04* (2006.01)

(52) U.S. Cl.
CPC ... *G06F 1/04* (2013.01); *G06F 1/12* (2013.01)

(58) Field of Classification Search
CPC .............. G06F 1/04; G06F 1/12; G06F 1/14; G06F 1/10; G06F 1/06
See application file for complete search history.

(56) References Cited

U.S. PATENT DOCUMENTS

| | | | |
|---|---|---|---|
| 5,327,468 A | 7/1994 | Edblad et al. | |
| 6,098,178 A | 8/2000 | Moretti et al. | |
| 6,449,291 B1 | 9/2002 | Burns et al. | |
| 7,058,838 B2 * | 6/2006 | Xu | 713/400 |
| 7,171,573 B2 | 1/2007 | Scheele | |
| 8,489,775 B2 * | 7/2013 | Berke et al. | 709/248 |
| 8,930,579 B2 * | 1/2015 | Pleasant et al. | 709/249 |
| 2005/0055469 A1 | 3/2005 | Scheele | |

FOREIGN PATENT DOCUMENTS

WO    WO-2014134056 A1    9/2014

OTHER PUBLICATIONS

"International Application Serial No. PCT/US2014/018368, International Search Report mailed Jul. 28, 2014", 3 pgs.
"International Application Serial No. PCT/US2014/018368, Written Opinion mailed Jul. 28, 2014", 7 pgs.
Bain, William L, "Parallel Discrete Event Simulation Using Synchronized Event Schedulers", *Proceedings of the Fifth Distributed Memory Computing Conference*, (1990), 90-94.
Fujimoto, Richard, "Parallel Discrete Event Simulation", Taken from an article published in Communications ACM, Oct. 1990, (2010), 1-18.
"International Application Serial No. PCT/US2014/018368, International Preliminary Report on Patentability mailed Sep. 11, 2015", 8 pgs.

* cited by examiner

*Primary Examiner* — Fahmida Rahman
(74) *Attorney, Agent, or Firm* — Schwegman Lundberg & Woessner, P.A.

(57) ABSTRACT

Embodiments of a multi-processor system and method for synchronization and event scheduling of multiple processing elements are generally described herein. In some embodiments, timing marks are provided to the processing elements and a start-timer command is broadcasted to the processing elements after an initial timing mark. The start-timer command instructs the processing elements to initiate an internal time reference after receipt of a next timing mark. Each of the processing elements maintains a copy of the internal time reference which may be used for synchronized event scheduling.

20 Claims, 2 Drawing Sheets

MULTI-PROCESSOR SYSTEM AND METHOD FOR INTERNAL TIME SYNCHRONIZATION AND EVENT SCHEDULING OF MULTIPLE PROCESSORS

GOVERNMENT RIGHTS

This invention was not made with Government support. The Government does not have certain rights in this invention.

TECHNICAL FIELD

Embodiments pertain to multi-processor systems. Some embodiments pertain to timing synchronization and event scheduling of multiple processors in multi-processor systems. Some embodiments pertain to multi-processor radio systems, including software-defined radios (SDRs). Some embodiments pertain to waveform synchronization in multi-processor radio systems.

BACKGROUND

In multi-processor systems, timing and synchronization between multiple processors is important for precisely scheduling events at future times. One issue is maintaining this timing and synchronization between multiple processors. Conventional time-of-day (TOD) approaches based on a real-time clock (RTC) have several disadvantages. For example, the TOD can change while the system is operational causing a potential discontinuity in event scheduling. Furthermore, TOD logic within each processor to handle items such as leap year or months with different numbers of days results in inefficiencies and provides opportunities for inconsistencies.

Thus, what is needed is a multi-processor system and improved method for internal time synchronization and event scheduling. What is also needed is a multi-processor system and method for internal time synchronization and event scheduling that does not rely on conventional TOD approaches.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
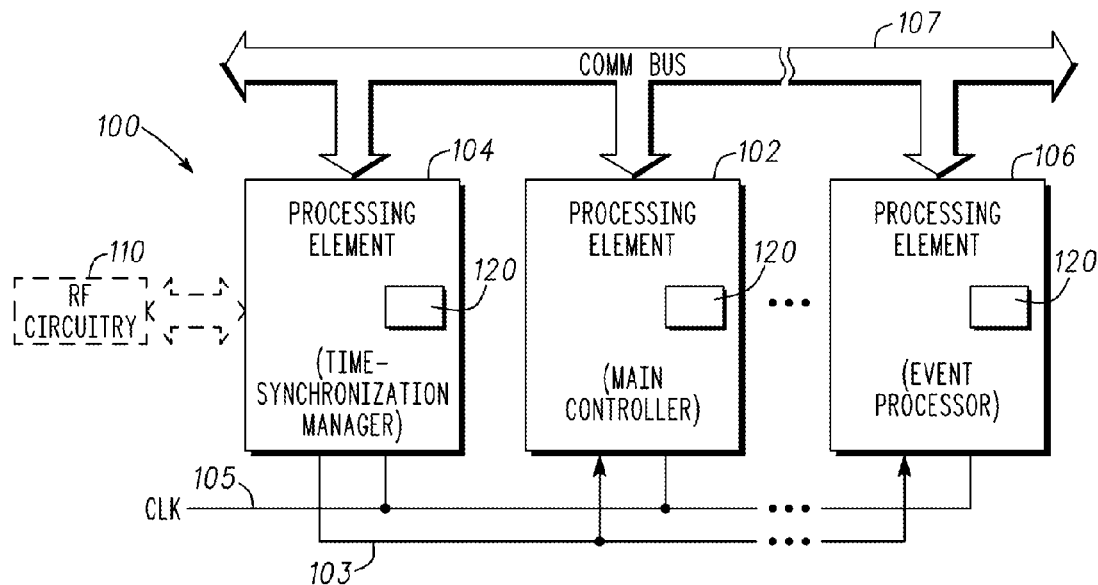
FIG. 1 illustrates a multi-processor system in accordance with some embodiments.

FIG. 1 illustrates a multi-processor system in accordance with some embodiment. Multi-processor system 100 may include a plurality of processing elements including a first processing element 104, a second processing element 102 and a third processing element 106. Additional processing elements may also be included but are not illustrated. The processing elements 102, 104 and 106 may communicate over a communication bus 107 and may utilize a common clock 105. In accordance with some embodiments, the first processing element 104 may be a time-synchronization manager and the second processing element 102 may be a main controller. In some embodiments, the third processing element 106 may be an event processor for implementing event processing. Other processing elements, such as processing element 102 may also implement event processing.

In some embodiments, the first processing element 104 may be arranged to provide timing marks to the other processing elements (e.g., processing elements 102 and 106) and broadcast a start-timer command to the other processing elements after an initial timing mark. The start-timer command may instruct the other processing elements to initiate an internal time reference after receipt of a next timing mark. The first processing element 104 may also initiate an internal time reference after receipt of a next timing mark. In some embodiments, the internal time reference may be used for event scheduling allowing a processing element to schedule an event to occur in the future based on the internal time reference. For synchronous event scheduling, at least one of the processing elements may be arranged to provide an event command for an event to be initiated when the internal time references of the participating processing elements simultaneously reach a time-stamp value or the offset indicated by the event command. These embodiments are described in more detail below.

In some embodiments, the timing marks may be part of a timing-synchronization signal 103 that has a predetermined number of timing marks per time period. In some embodiments, the timing marks may comprise pulses and the timing-synchronization signal 103 may have a predetermined number of pulses per time period. Each of the processing elements, including the first processing element 104, may be arranged to wait until the next pulse after the start-timer command to initiate its internal time reference.

In some embodiments, a one pulse-per-second (1 PPS) signal may be used for the timing-synchronization signal 103, although the scope of the embodiments is not limited in this respect. The number of timing marks per time period may be determined to allow sufficient time for the start-timer command to be propagated to all the processing elements of the system 100 allowing the processing elements to initiate their internal time reference concurrently upon receipt of the next timing mark. In some embodiments, the timing-synchronization signal 103 may be a discrete signal, although this is not a requirement.

In some embodiments, the start-timer command may be broadcast by the first processing element 104 over the communication bus 107 after the initial timing mark. In some embodiments, the timing-synchronization signal 103 may be provided by the first processing element 104 over a general purpose input/output (GPIO) signal path, although this is not a requirement as any direct signaling path may be used.

In some embodiments, each of the processing elements 102, 104, 106 includes an internal time counter 120 to generate the internal time reference. Each internal time counter 120 may be arranged to begin counting upon receipt of the next timing mark following the start-timer command. In these embodiments, each internal time counter 120 may count at a rate based on the common clock signal 105 that is provided to each of the processing elements. In some embodiments, each internal time counter 120 may begin counting up from a predetermined value, such as zero, upon receipt of the next timing mark, so that each internal time counter 120 maintains the same count value. In some embodiments, each of the internal time counters 120 may comprise a multi-bit register arranged to count up from zero or another predetermined value upon receipt of the next timing mark.

In some embodiments, the common clock signal 105 may comprise a 100 MHz clock signal and each internal time counter 120 may comprise a 48-bit register, although the scope of the embodiments is not limited in this respect. In these embodiments, each 48-bit register is able to count up to approximately $2.8\times10^{14}$ microseconds (the equivalent of 8.9 years) allowing the processing elements to remain time-synchronized throughout this time period. In these embodiments that use a 100 MHz clock signal, each processing element 102, 104, and 106 may be counting in lock-step incrementing its register every microsecond.

In accordance with some embodiments, internal time is maintained by incrementing a register of which each processing element maintains a copy. The register value may be provided on system startup and is kept in sync by virtue of each processing element operating on the same clock. These registers may be used for event scheduling keeping all components in synchronization.

In some embodiments, the size (# of bits) of the registers may be selected so that based on a rate of the common clock signal; synchronization of the registers can be maintained for at least several months. In the above example, a 32-bit register, for example, that is being incremented at a rate of 100 MHz would only accommodate enough bits to provide synchronization for about 1.2 hours.

Figure 2:
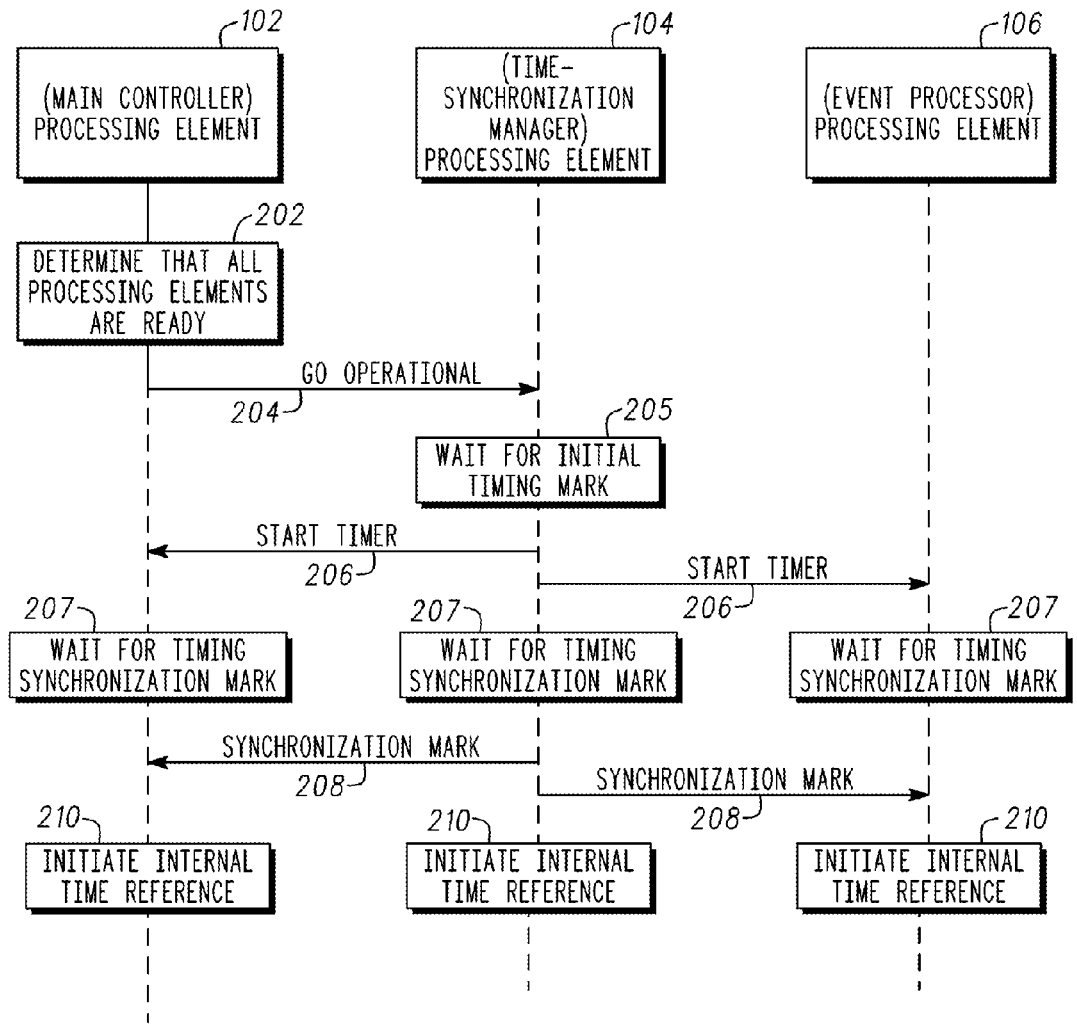
FIG. 2 illustrates a sequence of operations for internal time synchronization in accordance with some embodiments.

FIG. 2 illustrates a sequence of operations for internal time synchronization in accordance with some embodiments. The sequence of operations may be performed by a multi-processor system that includes the first processing element 104 operating as the time-synchronization manager, the second processing unit 102 operating as the main controller, and the third processing element 106 operating as one of the event processors. The first processing element 104 and the second processing element 102 may also operate as one of the event processors.

Operation 202 may be performed by the second processing element 102 (e.g., the main controller) and may include determining when the other processing elements are ready for internal time synchronization. In some embodiments, as part of operation 202, after system startup the second processing element 102 may send a setup message to each of the other processing elements and wait for a response indicating that setup is complete. Once the setup completes, the system may be ready for internal time synchronization.

Operation 204 may also be performed by the second processing element 102 and may include providing a go-operational command to the first processing element 104 (e.g., the time-synchronization manager) over communication bus 107. The go-operational command may instruct the first processing element 104 to wait for an initial timing mark (operation 205) and to broadcast the start-timer command (operation 206) after receipt of the initial timing mark. In these embodiments, operation 204 may be performed when the second processing element 102 has determined that all the processing elements are ready for internal time synchronization.

In some embodiments, the initial timing mark may be the first pulse of the timing-synchronization signal 103 after the first processing element 104 receives the go-operational command from the second processing element 102. In some embodiments, the first processing element 104 may wait for the initial timing mark after receipt of the go-operational command 204.

In operations 207, each of the processing elements may wait for a timing synchronization mark 208. The timing synchronization mark 208 may be the next timing mark after the start-timer command was broadcasted by the first processing element 104 in operation 206. In some embodiments, the timing synchronization mark 208 may be provided as part of the timing-synchronization signal 103 (FIG. 1) that is continuously provided by the first processing element 104 to the other processing elements.

In operation 210, upon receipt of the timing synchronization mark 208, the processing elements 102, 104 and 106 may each initiate their internal time reference. In some embodiments, each internal time counter 120 may be arranged to begin counting upon receipt of the timing synchronization mark 208 and may be arranged to count at the rate of the common clock signal 105 that is provided to each of the processing elements. In these embodiments, when the internal time counters 120 of the processing elements are generating an internal time reference, the processing elements are internally synchronized (e.g., counting in lock-step by incrementing a register every clock cycle).

Once the processing elements are internally synchronized, any one of the processing elements may be arranged to provide an event command with a time-stamp value to indicated ones of the processing elements. In some embodiments, the time-stamp value may indicate an offset from a start time of the internal time reference. The event command may instruct the indicated processing elements to initiate an event at a relative time indicated by the time-stamp value. In these embodiments, the relative time indicated by the time-stamp value may be a time in the future at which the event is to be executed. In this way synchronized event scheduling between multiple processing elements is achieved. In some embodiments, the time-stamp value may indicate a specific value that the internal time counters 120 will reach at which the event is scheduled.

In some embodiments, prior to providing an event command, the processing element providing the event command may correlate a time-of-day (TOD) for the event with the relative time of the internal time references to determine the time-stamp value for the event. The event command may then be generated to include the time-stamp value. In these embodiments, a processing element that is to provide an event command may have access to a real-time clock (RTC) for the TOD.

In some embodiments, the multi-processor system 100 may be part of a multi-processor radio system, such as a software-defined radio (SDR), although the scope of the embodiments is not limited in this respect. In these embodiments, the multi-processor system 100 may also include, among other things, radio-frequency (RF) circuitry 110 that is controllable by the first processing element 104. In these embodiments, an event may be an RF or digital signal processing event for a predetermined waveform by one or more of the processing elements including transmission and/or reception of the waveform by digital and RF circuitry 110. In some embodiments, the predetermined waveform may be a time-division multiple access (TDMA) or frequency hopping (FH) waveform. The event may also include the setting of RF frequencies, filter selection, and gain. The waveform or portions thereof may be generated by one or more of the processing elements in response to internally time-synchronized events. In these embodiments, the internal time references of the processing elements may be used for waveform synchronization. The multi-processor system 100 may attain the critical timing needed for FH and TDMA waveforms.

In some embodiments, the processing elements may include field-programmable gate arrays (FPGAs), general purpose processors (GPPs) and/or digital signal processors (DSPs). In some embodiments, the first processing element 104 may be an FPGA, the second processing element 102 may be a GPP, and the third processing element 106 may be a DSP. In some embodiments, the communication bus 107 may be a Peripheral Component Interconnect Express (PCIe) although this is not a requirement.

In some embodiments, the first, second and third processing elements 102, 104 and 106 may be part of a first portion of the multi-processor system 100. In these embodiments, the multi-processor system 100 may also include a second portion that is separate from the first portion. The second portion may have a separate communication bus. The system may include an intersystem communication bus for communication between the first and second portions. The second portion may include one or more additional processing elements, each having an internal time reference, similar to the processing elements of the first portion.

In these embodiments that include separate portions of processing elements, the second processing element 102 may determine when the other processing elements of both portions are ready for internal time synchronization and may issue a go-operational command to the first processing element 104. In these embodiments, the first processing element 104 may broadcast the start-timer command to the other processing elements of the first portion after an initial timing mark. The second processing element 102 may forward the start-timer command to a selected processing element of the second portion through the intersystem communication bus. The selected processing element of the second portion that receives the start-timer command may forward the start-timer command to other processing elements of the second portion. In this way, the start-timer command is propagated to all processing units of both the first and second portions. The processing elements of the first and second portions may then wait until the next timing mark to initiate their internal time reference. In these embodiments, sufficient time exists between timing marks for the start-timer command to be propagated to the processing elements of both portions.

Figure 3:
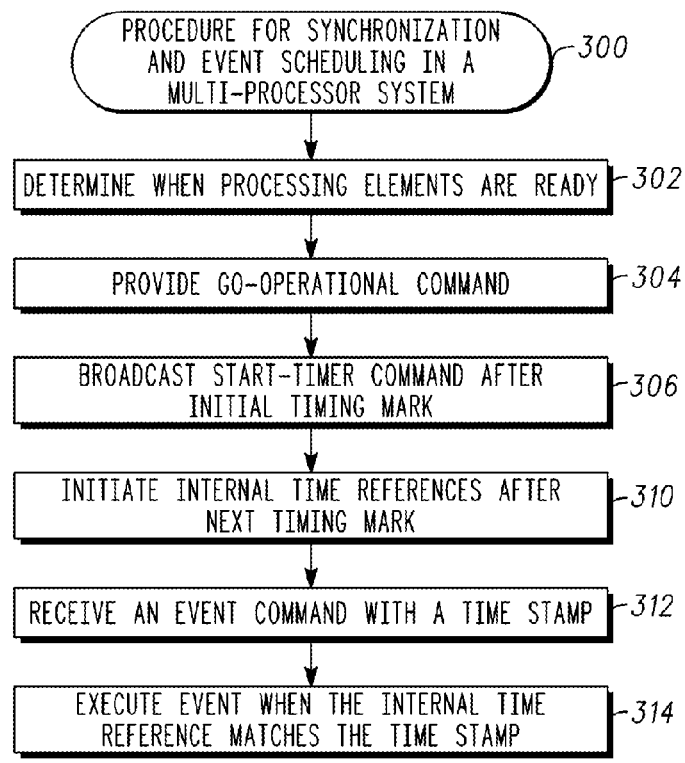
FIG. 3 illustrates a procedure for internal time synchronization and event scheduling in accordance with some embodiments.

FIG. 3 illustrates a procedure for internal time synchronization and event scheduling in accordance with some embodiments. Procedure 300 may be performed by a multi-processor system, such as multi-processor system 100 (FIG. 1), although other systems may also be used.

Operation 302 comprises determining when the processing elements are ready for internal time synchronization. Operation 302 may be performed by the main controller.

In operation 304, a go-operational command may be issued. Operation 304 may be performed by the main controller after the main controller has determined that the processing units are ready for internal time synchronization.

In operation 306, a start-timer command may be broadcasted to the processing elements after the receipt of an initial timing mark. Operation 306 may be performed by the time-synchronization manager after receipt of an initial timing mark following the start-time command.

In operation 310, the processing elements of the system may initiate their internal time references after receipt of a next timing mark following the start-timer command. After initiation of their internal time references, the processing elements may be synchronized (e.g., counting in lock-step every clock cycle).

In operation 312, an event command may be issued by one of the processing elements and may include a time-stamp value. The time-stamp value may correspond to a value that the internal time references of the processors will reach in the future.

In operation 314, the event command may be executed by participating processors when their internal time reference matches the time-stamp value of the event command.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multi-processor system comprising:
a plurality of processing elements, each arranged to generate an internal time reference,
wherein a first of the processing elements is arranged to:
provide to other processing elements of the plurality of processing elements, in response to a go-operational command from a second of the processing elements, a timing-synchronization signal comprising an initial timing mark and timing marks subsequent to the initial timing mark; and
broadcast a start-timer command to the other processing elements after the initial timing mark, the start-timer command instructing the other processing elements to initiate their internal time reference upon receipt of a next timing mark of the subsequent timing marks,
wherein for synchronous event scheduling, at least one of the processing elements is arranged to provide an event command that includes a time-stamp value for an event to be initiated when the internal time references of participating processing elements simultaneously reach the time-stamp value indicated by the event command.

2. The multi-processor system of claim 1 wherein each of the processing elements includes an internal time counter to generate the internal time reference,
wherein each internal time counter is arranged to begin counting upon receipt of the next timing mark, and
wherein each internal time counter is arranged to count at a rate based on a common clock signal that is provided to each of the processing elements.

3. The multi-processor system of claim 2 wherein the timing marks comprise pulses and the timing-synchronization signal has a predetermined number of pulses per time period, and
wherein each of the processing elements is arranged to wait until a next pulse after receipt of the start-timer command to initiate the internal time reference.

4. The multi-processor system of claim 2 wherein each of the internal time counters comprises a multi-bit register arranged to count up from a predetermined value upon receipt of the next timing mark.

5. The multi-processor system of claim 4 wherein the first of the processing elements is a time-synchronization manager, and
wherein the second of the processing elements is a main controller that is arranged to determine when the other processing elements are ready for internal time synchronization and to provide the go-operational command to the first of the processing elements after the other processing elements are ready for internal time synchronization, the go-operational command instructing the first of the processing elements to broadcast the start-timer command after the initial timing mark.

6. The multi-processor system of claim 5 wherein when the internal time counters of the processing elements are each generating the internal time reference, the processing elements are synchronized, and
wherein any one or more of the processing elements is arranged to:
provide the event command with the time-stamp value to indicated ones of the processing elements, the time-stamp value indicating an offset from a start time of the internal time reference, the event command instructing the indicated processing elements to initiate an event at a relative time indicated by the time-stamp value.

7. The multi-processor system of claim 6 wherein the time-stamp value is configured to indicate a specific value to be reached by the internal time counters.

8. The multi-processor system of claim 7 wherein prior to providing the event command, the processing element providing the event command is further arranged to:
correlate a time-of-day (TOD) for the event with the relative time of the internal time reference to determine the time-stamp value for the event; and
generate the event command to include the time-stamp value.

9. The multi-processor system of claim 7, wherein the system is part of a software-defined radio (SDR) and includes radio-frequency (RF) circuitry controllable at least by the first of the processing elements; and
wherein the event is an RF event comprising generation of a predetermined waveform by one or more of the processing elements including transmission or reception of the waveform by the RF circuitry.

10. A method for synchronization and event scheduling of multiple processing elements in a multi-processor system comprising a plurality of processing elements, the method comprising:
providing to other processing elements of the plurality of processing elements, by a first of the processing elements, a timing-synchronization signal comprising an initial timing mark and timing marks subsequent to the initial timing mark;
broadcasting, by the first of the processing elements, a start-timer command after the initial timing mark in response to a go-operational command from a second of the processing elements;
initiating, by each of the processing elements in response to the start-timer command, an internal time reference after receipt of a next of the timing marks; and
providing an event command, by a third of the processing elements, for an event to be initiated when the internal time references of participating processing elements simultaneously reach a time-stamp value indicated by the event command.

11. The method of claim 10 wherein each of the processing elements includes an internal time counter to generate the internal time reference,
the method further comprising:
beginning counting upon receipt of the next of the timing marks by each of the internal time counters; and
counting at a rate based on a common clock signal that is provided to each of the processing elements.

12. The method of claim 11 wherein the timing marks comprise pulses and the timing-synchronization signal has a predetermined number of pulses per time period,
the method further comprising waiting until a next pulse after receipt of the start-timer command to initiate the internal time reference.

13. The method of claim 12 further comprising:
providing, by the second of the processing elements, the go-operational command to the first processing element when the processing elements are ready for internal time synchronization, the go-operational command instructing the first processing element to broadcast the start-timer command after the initial timing mark.

14. The method of claim 13 wherein the time-stamp value is configured to indicate a specific value to be reached by the internal time counters, the method further comprising,
prior to providing the event command, by the third of the processing elements:
correlating a time-of-day (ToD) for the event with a relative time of the internal time reference to determine the time-stamp value for the event; and
generating the event command to include the time-stamp value.

15. A multi-processor system comprising:
a plurality of processing elements, including a time-synchronization manager, a main controller and at least one other processing element, each processing element arranged to generate an internal time reference with an internal time counter,
wherein the time-synchronization manager is arranged to:
provide a timing-synchronization signal comprising timing marks to the other processing elements; and
broadcast, in response to a go-operational command from the main controller, a start-timer command to the other processing elements after an initial timing mark, the start-timer command instructing the other processing elements to each initiate the internal time counter and begin counting upon receipt of a next timing mark,
wherein each internal time counter is arranged to count at a rate based on a common clock signal, and
wherein for synchronous event scheduling, at least one of the processing elements is arranged to provide an event command for an event to be initiated when the internal time counters of participating processing elements simultaneously reach a value indicated by the event command.

16. The multi-processor system of claim 15 wherein each of the internal time counters comprises a register arranged to count up from a predetermined value upon receipt of the next timing mark, and
wherein the value indicated by the event command corresponds with a count value that the registers of the processing elements are to simultaneously reach for synchronous event scheduling for the processing elements participating in the event.

17. The multi-processor system of claim 16 wherein a size of the registers is selected based on the rate of the common clock signal to maintain synchronization of the registers for a time period of at least several months.

18. The multi-processor system of claim 17 wherein the main controller is arranged to:

provide the go-operational command to the time-synchronization manager when the other processing elements of the plurality of processing elements are ready for internal time synchronization, the go-operational command instructing the time-synchronization manager to broadcast the start-timer command after the initial timing mark.

19. A method for synchronization and event scheduling of multiple processing elements in a multi-processor system comprising a plurality of processing elements, the method comprising:

receiving, from a first of the processing elements, a timing-synchronization signal comprising an initial timing mark and subsequent timing marks;

receiving from the first of the processing elements a start-timer command broadcast after the initial timing mark, in response to a go-operational command from the second of the processing elements, whereby each of the processing elements, in response to the start-timer command, initiates counting of a time count register after receipt of a next of the timing marks;

receiving from one of the processing elements an event command for an event, the event command including a count value for synchronous event scheduling, the event to be initiated when the time count registers of participating processing elements simultaneously reach the count value; and waiting until the count value is reached by the each of the time count registers and participating in performing the event.

20. The method of claim 19 wherein the multi-processor system is part of a software-defined radio (SDR) and includes radio-frequency (RF) circuitry controllable at least by the first of the processing elements; and wherein the event is an RF event comprising generation of a predetermined waveform by one or more of the processing elements including transmission or reception of the waveform by the RF circuitry.

* * * * *